(12) United States Patent
Tajima et al.

(10) Patent No.: US 12,522,298 B2
(45) Date of Patent: Jan. 13, 2026

(54) OFF-ROAD VEHICLE

(71) Applicant: KAWASAKI MOTORS, LTD., Hyogo (JP)

(72) Inventors: Atsushi Tajima, Akashi (JP); Yusuke Fujita, Akashi (JP); Taisuke Morita, Akashi (JP); Kento Kariya, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 321 days.

(21) Appl. No.: 18/376,487

(22) Filed: Oct. 4, 2023

(65) Prior Publication Data
US 2025/0115304 A1 Apr. 10, 2025

(51) Int. Cl.
| | | |
|---|---|---|
| *B62D 25/08* | (2006.01) | |
| *B60K 13/02* | (2006.01) | |
| *B60K 17/06* | (2006.01) | |
| *B62D 33/02* | (2006.01) | |
| *F02M 35/16* | (2006.01) | |
| *B60R 1/04* | (2006.01) | |

(52) U.S. Cl.
CPC ............ *B62D 25/082* (2013.01); *B60K 13/02* (2013.01); *B60K 17/06* (2013.01); *B62D 33/02* (2013.01); *F02M 35/162* (2013.01); *B60R 1/04* (2013.01)

(58) Field of Classification Search
CPC .... B62D 25/082; B62D 25/087; B62D 33/02; B60K 13/02; B60K 13/04; B60K 13/06; B60K 17/06; F02M 35/162
See application file for complete search history.

(56) References Cited

U.S. PATENT DOCUMENTS

| | | | | |
|---|---|---|---|---|
| 7,562,739 | B2 * | 7/2009 | Lan | B62K 5/01 |
| | | | | 180/339 |
| 8,157,039 | B2 * | 4/2012 | Melvin | B60K 11/08 |
| | | | | 180/68.1 |
| 9,713,976 | B2 * | 7/2017 | Miller | B60G 15/062 |
| 10,197,149 | B2 * | 2/2019 | Kuji | F16H 57/0416 |
| 11,919,587 | B2 * | 3/2024 | Jyouzaki | B62D 33/02 |
| 12,139,201 | B2 * | 11/2024 | Li | B62D 21/183 |
| 2017/0276234 | A1 | 9/2017 | Kuji et al. | |

* cited by examiner

*Primary Examiner* — John D Walters
(74) *Attorney, Agent, or Firm* — XSENSUS LLP

(57) ABSTRACT

An off-road vehicle includes an air duct located in an engine room and connected to a drive assembly. The air duct includes: a first portion extending upward; a second portion which extends from the first portion, curves downward in an inverted U shape, and is located higher than a loading space; and a third portion extending downward from the second portion and including an end opening.

17 Claims, 10 Drawing Sheets

OFF-ROAD VEHICLE

BACKGROUND OF THE INVENTION

Field of the Invention

The present disclosure relates to an off-road vehicle including a continuously variable transmission.

Description of the Related Art

US 2017/0276234 A1 discloses a CVT (continuously variable transmission) mounted on an off-road vehicle which is also called a utility vehicle. The CVT smoothly changes the rotational speed of driving power output by an internal combustion engine. Specifically, the CVT includes: a CVT case accommodating a driving pulley, a driven pulley, and a belt; an intake duct connected to the CVT case; and an exhaust duct connected to the CVT case. Air outside the vehicle is taken into the CVT case through the intake duct by the rotation of the pulleys. The taken air cools the belt and the like. The air that has been increased in temperature by the above cooling is discharged to the outside of the vehicle through the exhaust duct.

In a typical off-road vehicle, a drive assembly including an internal combustion engine and a CVT is located under a cargo bed. Since a space under the cargo bed is exposed to the outside, the intake duct and the exhaust duct may be covered with water. Therefore, it is beneficial to take measures such that even when the off-road vehicle travels under a severe condition, water does not reach the inside of the drive assembly through the ducts.

SUMMARY OF THE INVENTION

An off-road vehicle according to one aspect of the present disclosure includes: a vehicle body frame; a cabin including at least one occupant seat supported by the vehicle body frame; a cargo bed which is supported by the vehicle body frame, is located behind the cabin, and defines a loading space; an engine room which is located behind the cabin and under and in front of the cargo bed; a drive assembly located in the engine room and including a prime mover supported by the vehicle body frame and a continuously variable transmission which changes a rotational speed of driving power output from the prime mover; and an air duct which is located in the engine room, is connected to the drive assembly, and includes a first portion extending upward, a second portion which extends from the first portion, curves downward in an inverted U shape, and is located higher than the loading space, and a third portion extending downward from the second portion and including an end opening.

DETAILED DESCRIPTION

Hereinafter, an embodiment will be described with reference to the drawings. Directions mentioned in the following description are based on directions of an off-road vehicle 1 unless otherwise specified. A front-rear direction corresponds to a vehicle longitudinal direction, and a left-right direction corresponds to a vehicle width direction.

Figure 1:
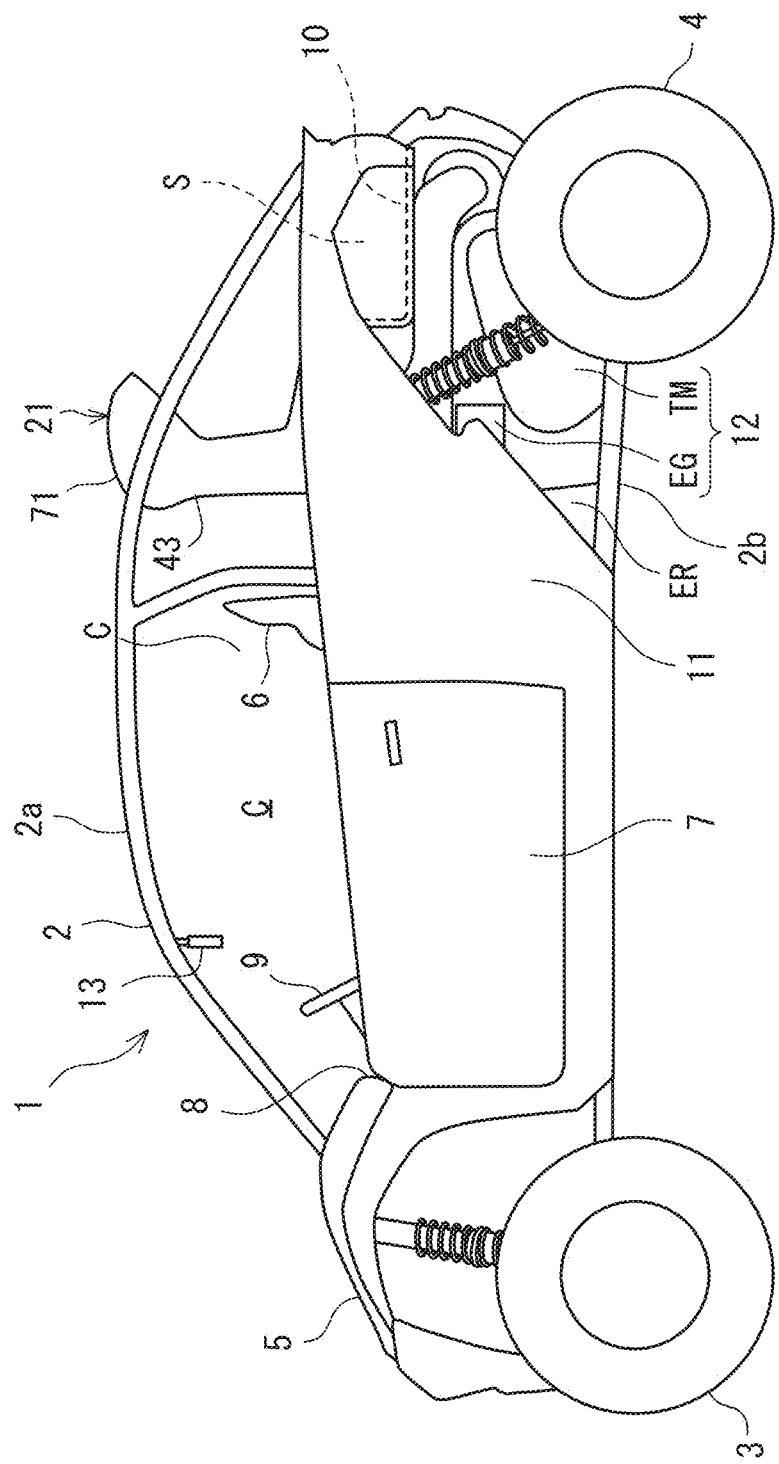
FIG. 1 is a left side view of an off-road vehicle according to an embodiment.

FIG. 1 is a right side view of the off-road vehicle 1 according to the embodiment. As shown in FIG. 1, the off-road vehicle 1 includes: a vehicle body frame 2; a pair of left and right front wheels 3 supporting a front portion of the vehicle body frame 2; and a pair of left and right rear wheels 4 supporting a rear portion of the vehicle body frame 2. The vehicle body frame 2 is a pipe frame including pipes connected to each other. Tires of the front and rear wheels 3 and 4 are balloon tires for uneven ground traveling. A space between the left front wheel 3 and the right front wheel 3 is covered with a hood 5 from above.

An occupant seat 6 supported by the vehicle body frame 2 and including a driver's seat is located behind the hood 5. The vehicle body frame 2 includes, for example, a cabin frame 2a surrounding a cabin C in which the occupant seat 6 is located. The cabin C is exposed to the outside. A side door 7 is located at a lateral side of the cabin C. A dash panel 8 is located in front of the driver's seat. A steering wheel 9 is located at the dash panel 8 so as to project toward the driver's seat.

The cargo bed 10 supported by a rear frame 2b of the vehicle body frame 2 is located behind the cabin frame 2a. The cargo bed 10 defines a hollow loading space S that is open to the outside. An engine room ER is located behind the cabin frame 2a and under and in front of the cargo bed 10. The engine room ER is partially covered with a side cowl 11 that is exposed to the outside outward in the vehicle width direction. A drive assembly 12 supported by the vehicle body frame 2 is located in the engine room ER. The drive assembly 12 includes: an internal combustion engine EG as a prime mover; and a continuously variable transmission TM that changes the speed of the driving power output by the internal combustion engine EG.

Figure 2:
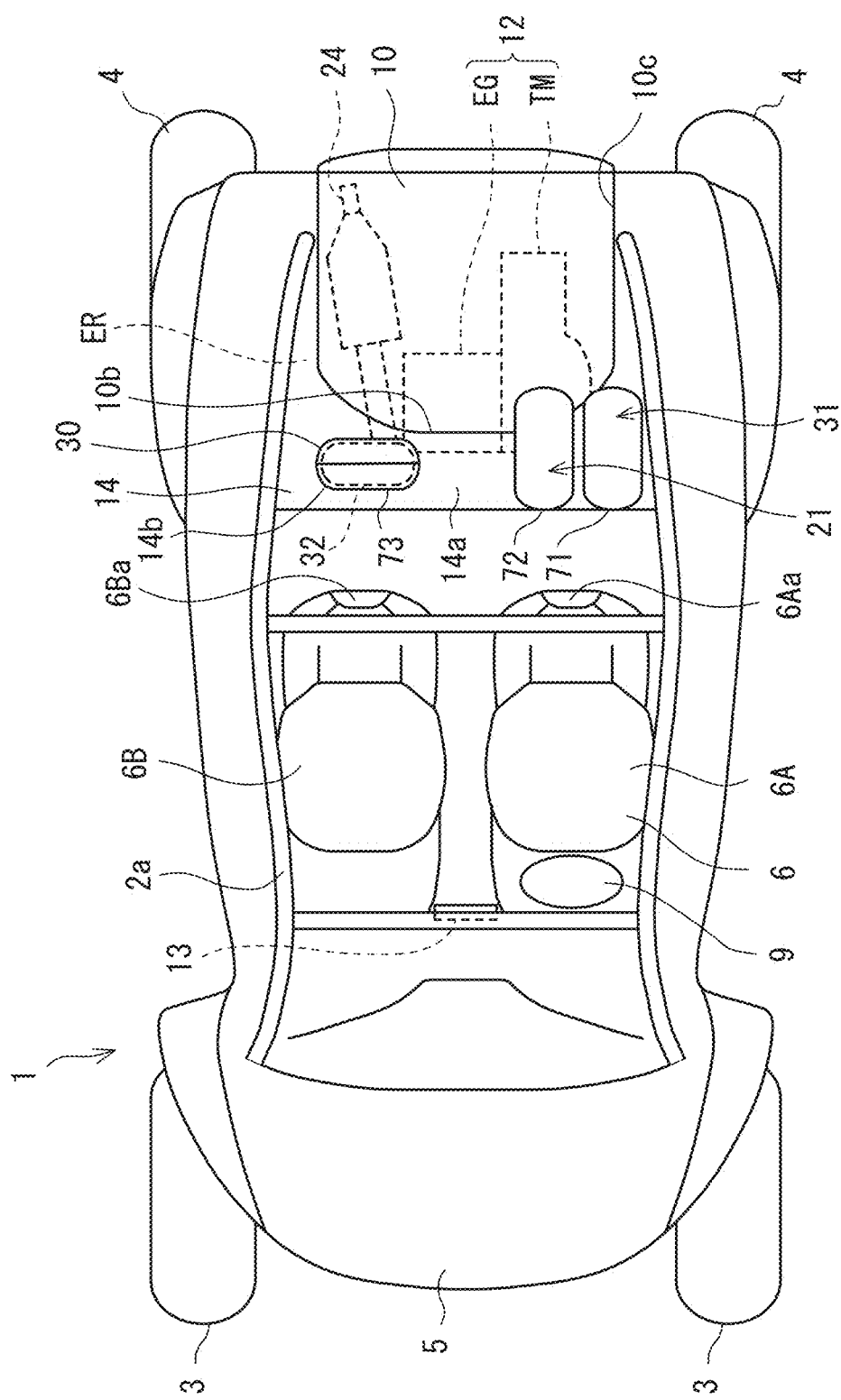
FIG. 2 is a plan view of the off-road vehicle of FIG. 1.

FIG. 2 is a plan view of the off-road vehicle 1 of FIG. 1. As shown in FIG. 2, the occupant seat 6 includes a driver's seat 6A and a passenger seat 6B which are lined up in the left-right direction. The driver's seat 6A includes a seat portion, a backrest portion, and a headrest 6Aa. The headrest 6Aa is located at an upper portion of the backrest portion and supports the head of a driver from behind. Similarly, the passenger seat 6B includes a seat portion, a backrest portion, and a headrest 6Ba. The headrest 6Ba is located at an upper portion of the backrest portion and supports the head of a passenger from behind. A rearview mirror 13 located in front of and above the occupant seat 6 is attached to the cabin frame 2a. The rearview mirror 13 is located between the driver's seat 6A and the passenger seat 6B in the left-right direction.

The cargo bed 10 includes: a bottom wall 10a; a front wall 10b projecting upward from a front side of the bottom wall 10a; and a pair of side walls 10c projecting upward from left and right sides of the bottom wall 10a. To be specific, the loading space S of the cargo bed 10 is defined by the bottom wall 10a, the front wall 10b, and the pair of side walls 10c and is open upward and rearward. An upper end of the loading space S corresponds to an upper end of the front wall 10b and upper ends of the side walls 10c.

An engine room cover 14 is located between the cabin C and the cargo bed 10 in the front-rear direction. The engine room ER is defined by the cargo bed 10 and the engine room cover 14 from above. To be specific, the internal combustion engine EG and the continuously variable transmission TM are located under the engine room cover 14 and the cargo bed 10. Although details will be described later, an EG intake duct 21 and an EG exhaust assembly 22 are connected to the internal combustion engine EG. A CVT intake duct 31 and a CVT exhaust duct 32 are connected to the continuously variable transmission TM.

Figure 3:
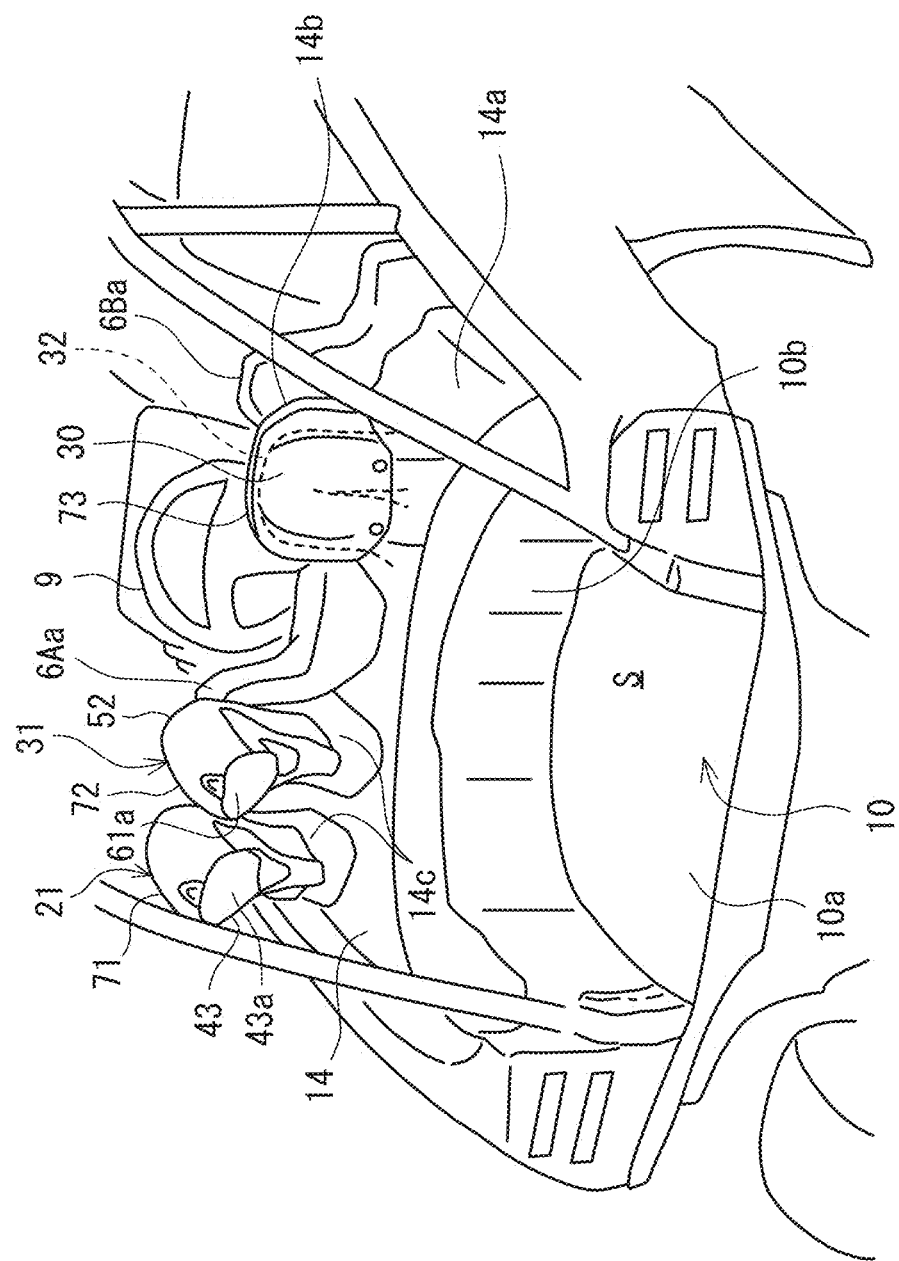
FIG. 3 is a perspective view showing a rear portion of the off-road vehicle of FIG. 1 when viewed from a rear-right side.
Figure 4:
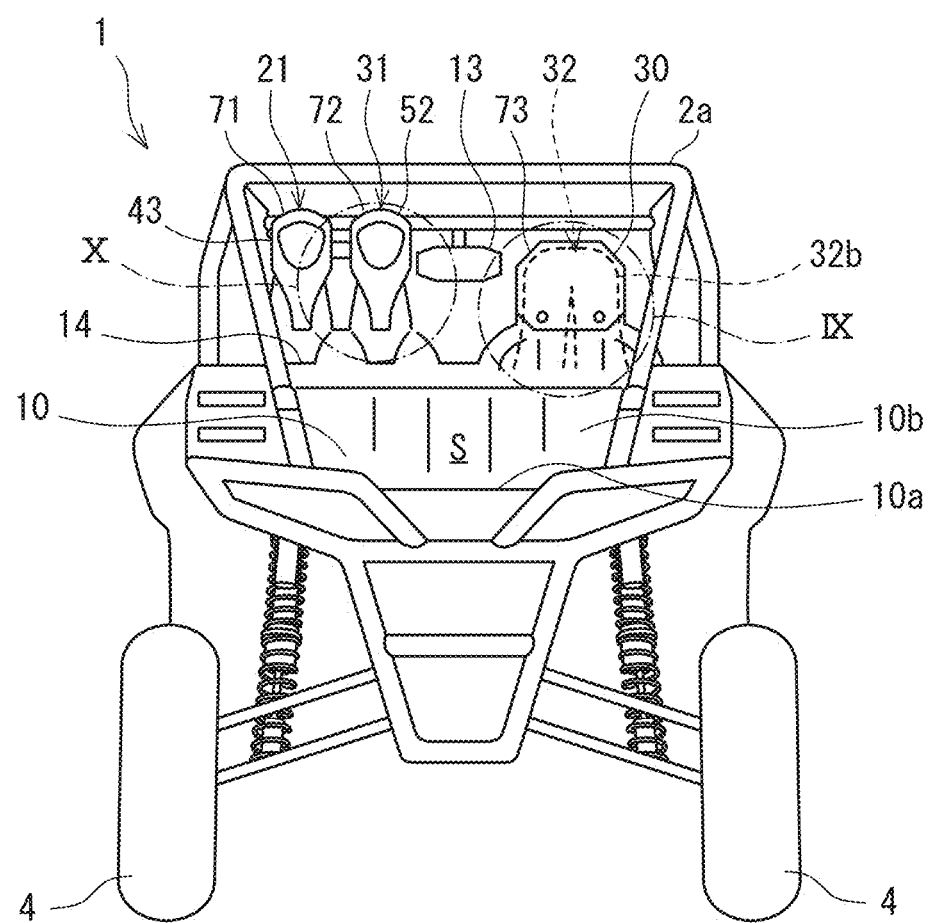
FIG. 4 is a rear view of the off-road vehicle of FIG. 1.

FIG. 3 is a perspective view showing a rear portion of the off-road vehicle 1 of FIG. 1 when viewed from a rear-right side. FIG. 4 is a rear view of the off-road vehicle 1 of FIG. 1. As shown in FIGS. 3 and 4, a base portion 14a of the engine room cover 14 extends in the left-right direction and covers the engine room ER from above. The EG intake duct 21 includes a stack portion 43 which projects upward from the engine room cover 14 and includes an intake port 43a. The CVT intake duct 31 includes a stack portion 52 which projects upward from the engine room cover 14 and includes an intake port 61a. The stack portion 43 and the stack portion 52 are located in front of the loading space S of the cargo bed 10. The EG intake duct 21 and the CVT intake duct 31 project upward beyond the loading space S. To be specific, the EG intake duct 21 and the CVT intake duct 31 project upward beyond the upper end of the front wall 10b of the cargo bed 10. An upper end of the EG intake duct 21 and an upper end of the CVT intake duct 31 are located higher than an upper end of the occupant seat 6.

A below-described second portion 32b (see FIG. 6) of the CVT exhaust duct 32 is located in front of the loading space S of the cargo bed 10 and projects upward beyond the loading space S. An upper end of the CVT exhaust duct 32 is located higher than the upper end of the occupant seat 6. The second portion 32b of the CVT exhaust duct 32 is covered with a rising wall portion 14b of the engine room cover 14 and a duct cover 30. To be specific, the second portion 32b of the CVT exhaust duct 32 is accommodated in an internal space defined by the rising wall portion 14b and the duct cover 30. A material of the duct cover 30 is the same as a material of the engine room cover 14. For example, the engine room cover 14 and the duct cover 30 are made of synthetic resin. A color of the duct cover 30 may be the same as a color of the engine room cover 14.

An upper portion of the EG intake duct 21 is a first projection 71 which is located in front of the cargo bed 10 and projects upward. The first projection 71 partially includes the EG intake duct 21 and projects upward from the engine room cover 14. An upper portion of the CVT intake duct 31 is a second projection 72 which is located in front of the cargo bed 10 and projects upward. The second projection 72 partially includes the CVT intake duct 31 and projects upward from the engine room cover 14. A combination of the rising wall portion 14b of the engine room cover 14 and the duct cover 30 is a third projection 73 which is located in front of the cargo bed 10 and projects upward. The third projection 73 partially includes the CVT exhaust duct 32 therein and projects upward from the base portion 14a of the engine room cover 14.

In the rear view of the vehicle, the first projection 71 and the second projection 72 overlap the headrest 6Aa of the driver's seat 6A. In the rear view of the vehicle, the third projection 73 overlaps the headrest 6Ba of the passenger seat 6B. In the rear view of the vehicle, the first to third projections 71 to 73 are located at positions which are different from the position of the rearview mirror 13 in the left-right direction. In the rear view of the vehicle, the first to third projections 71 to 73 are located so as to avoid the rearview mirror 13. In the rear view of the vehicle, the entire rearview mirror 13 is visually recognizable without being hidden by the first to third projections 71 to 73.

Figure 5:
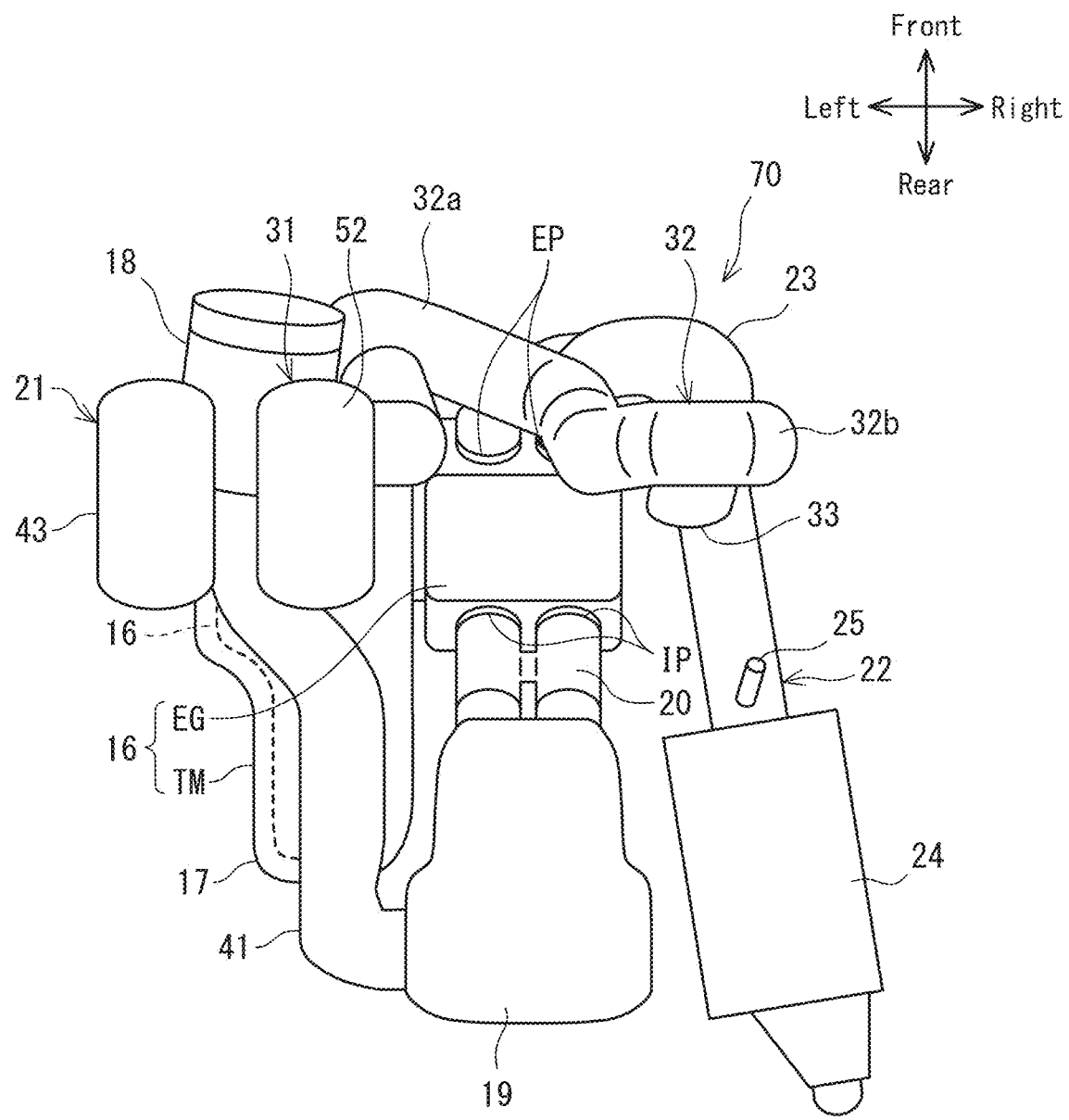
FIG. 5 is a plan view showing a drive assembly and an intake-exhaust structure in the off-road vehicle of FIG. 1.
Figure 6:
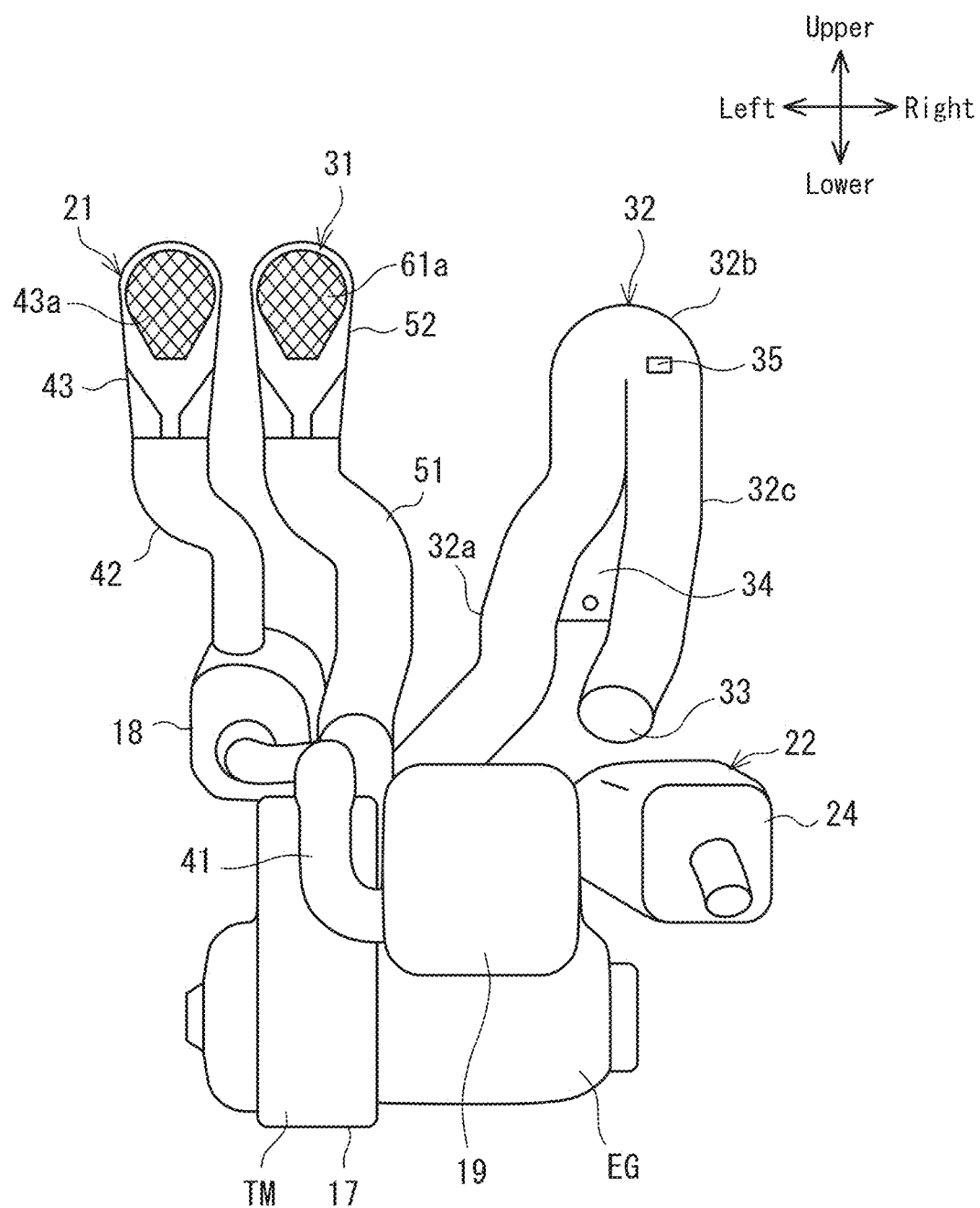
FIG. 6 is a rear view showing the drive assembly and the intake-exhaust structure which are shown in FIG. 5.
Figure 7:
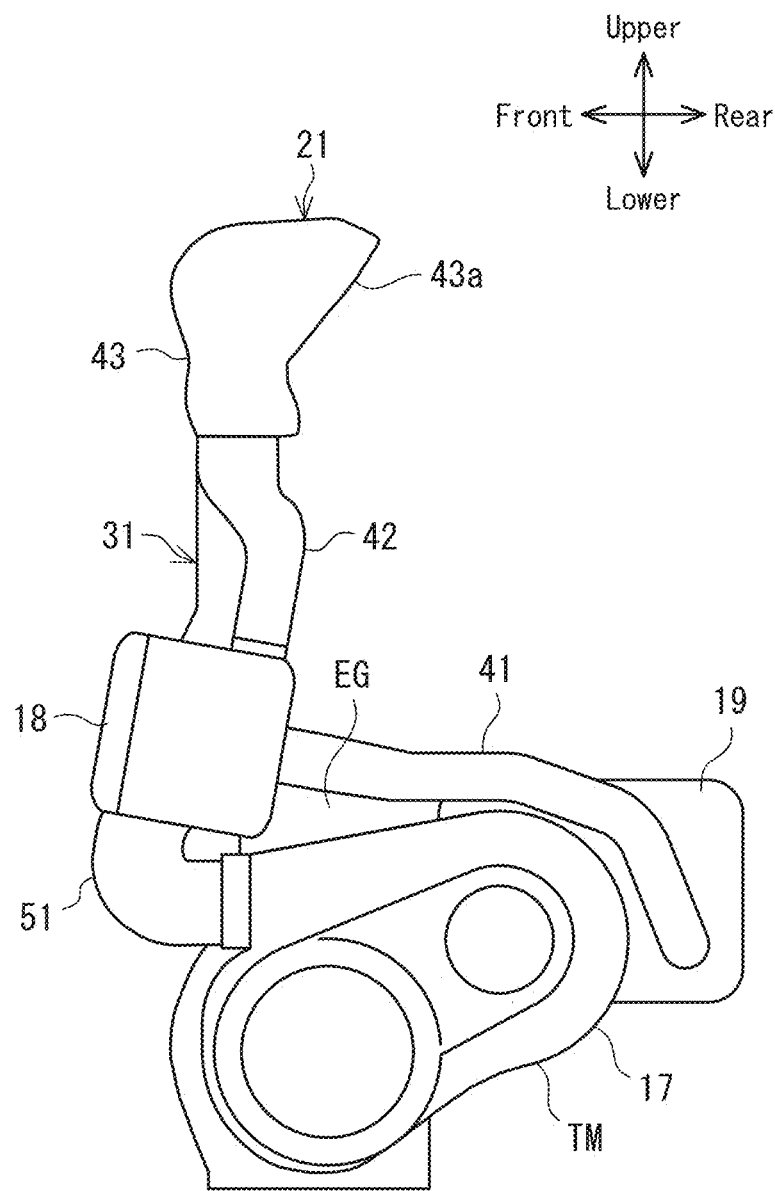
FIG. 7 is a left side view showing the drive assembly and the intake-exhaust structure which are shown in FIG. 5.
Figure 8:
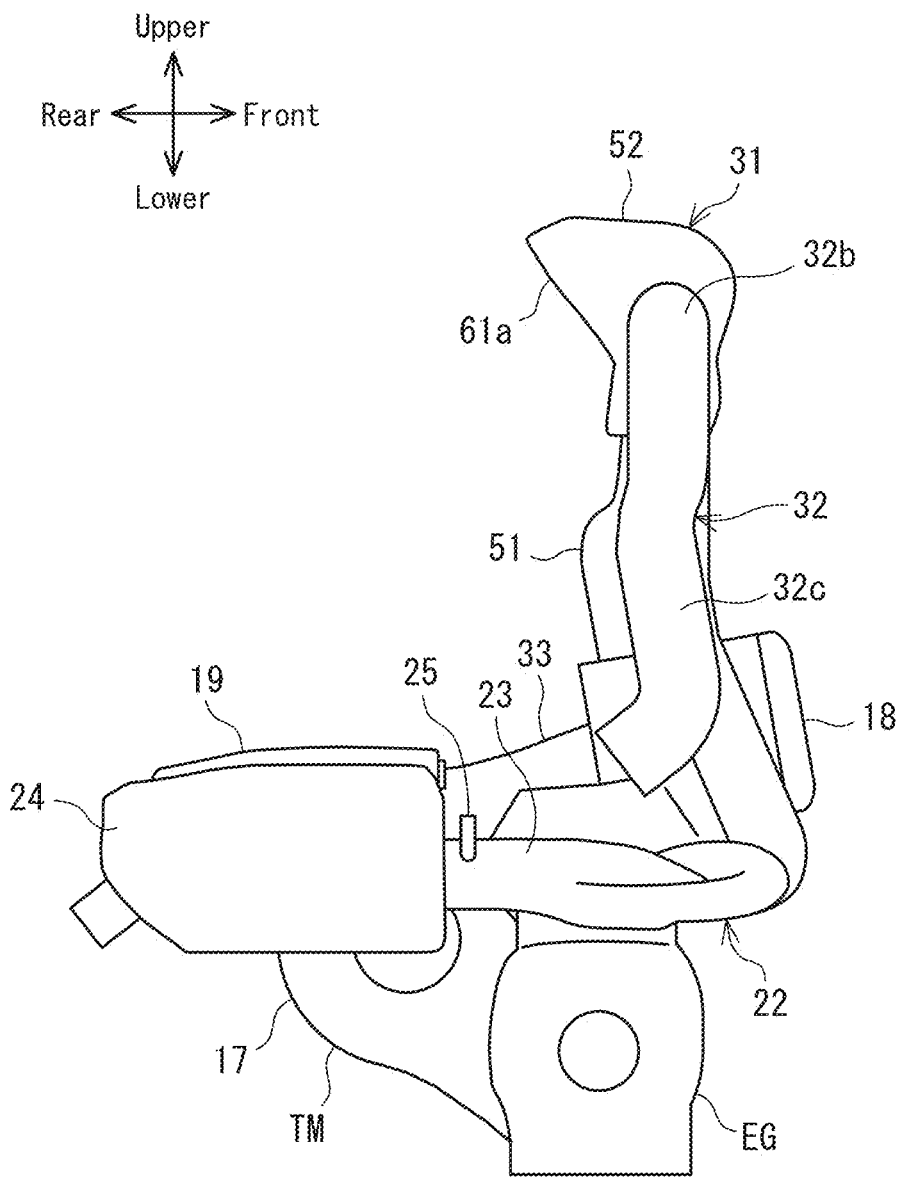
FIG. 8 is a right side view showing the drive assembly and the intake-exhaust structure which are shown in FIG. 5.

FIG. 5 is a plan view showing the drive assembly 12 and an intake-exhaust structure 70) in the off-road vehicle 1 of FIG. 1. FIG. 6 is a rear view showing the drive assembly 12 and the intake-exhaust structure 70 which are shown in FIG. 5. FIG. 7 is a left side view showing the drive assembly 12 and the intake-exhaust structure 70 which are shown in FIG. 5. FIG. 8 is a right side view showing the drive assembly 12 and the intake-exhaust structure 70 which are shown in FIG. 5. As shown in FIGS. 5 to 8, the drive assembly 12 includes the internal combustion engine EG and the continuously variable transmission TM. The internal combustion engine EG is located substantially at the middle of the engine room ER (see FIGS. 1 and 2) in the left-right direction. The continuously variable transmission TM is located at a left side of the internal combustion engine EG. The internal combustion engine EG may be a single cylinder engine or a multiple cylinder engine. FIGS. 5 to 8 show a two cylinder engine as the internal combustion engine EG.

The continuously variable transmission TM includes a continuously variable structure 16 and a CVT case 17 accommodating the continuously variable structure 16. For example, the continuously variable transmission TM is a belt CVT, and the continuously variable structure 16 includes a driving pulley, a driven pulley, and a belt. Rotational power of a crank shaft of the internal combustion engine EG is input to the driving pulley of the continuously variable structure 16 of the continuously variable transmission TM. Rotational power output from the driven pulley of the continuously variable structure 16 of the continuously variable transmission TM is transmitted to at least one of the pair of front wheels 3 and the pair of rear wheels 4 (see FIG. 1).

The intake-exhaust structure 70) includes an intake-exhaust structure of the internal combustion engine EG and an intake-exhaust structure of the continuously variable transmission TM. The internal combustion engine EG includes an intake port IP and an exhaust port EP. The intake port IP is located at a rear side of the internal combustion engine EG in the front-rear direction. The exhaust port EP is located at a front side of the internal combustion engine EG in the front-rear direction. A throttle body 20 is connected to the intake port IP of the internal combustion engine EG. The throttle body 20 is located behind the internal combustion engine EG. The throttle body 20 includes: a main body including an intake passage; and a throttle valve located at the intake passage.

An intake box 19 which defines an intake chamber therein is connected to an upstream end of the throttle body 20. The intake box 19 is located behind the throttle body 20. A downstream end of a tubular first duct portion 41 is connected to the intake box 19. The first duct portion 41 extends forward from the intake box 19 through a space located at a left side of the internal combustion engine EG. An air cleaner 18 is connected to an upstream end of the first duct portion 41.

The air cleaner 18 purifies air to be supplied to the intake port EP of the internal combustion engine EG. The air cleaner 18 includes a housing and a filter. The filter divides an internal space of the housing into a dirty space and a clean space. A passage of the first duct portion 41 communicates with the clean space in the air cleaner 18. The air cleaner 18 is located in a space which is located at a diagonally front-left side of the internal combustion engine EG.

A downstream end of the EG intake duct 21 is connected to the air cleaner 18. The EG intake duct 21 includes a second duct portion 42 and the stack portion 43. The second duct portion 42 is connected to the air cleaner 18, and the stack portion 43 is connected to the second duct portion 42. A passage of the second duct portion 42 communicates with the dirty space in the air cleaner 18. The second duct portion 42 extends upward from the air cleaner 18. An upstream end of the second duct portion 42 is connected to a downstream end of the stack portion 43.

The stack portion 43 includes the intake port 43a that is an inlet of outside air. The stack portion 43 projects upward from the engine room cover 14 (see FIG. 3). The throttle body 20, the intake box 19, the first duct portion 41, the air cleaner 18, and the second duct portion 42 are located in the engine room ER and under the engine room cover 14 and the cargo bed 10. Air flowing from the intake port 43a to the stack portion 43 flows through the second duct portion 42, the air cleaner 18, the first duct portion 41, the intake box 19, and the throttle body 20 in this order and is supplied to the intake port IP of the internal combustion engine EG.

The EG exhaust assembly 22 is connected to the exhaust port EP of the internal combustion engine EG. The EG exhaust assembly 22 includes an exhaust pipe 23 and a muffler 24. An upstream end of the exhaust pipe 23 is connected to the exhaust port EP of the internal combustion engine EG. The exhaust pipe 23 curves from the exhaust port EP to a right side of the internal combustion engine EG and extends rearward in a space located at the right side of the internal combustion engine EG. The exhaust pipe 23 is an exhaust manifold. The exhaust pipe 23 includes two branch pipe portions and one joined pipe portion formed such that the branch pipe portions join together.

An oxygen sensor 25 is attached to the joined pipe portion of the exhaust pipe 23. A detecting portion of the oxygen sensor 25 is exposed to a passage of the exhaust pipe 23 to detect the oxygen concentration of an exhaust gas flowing from the internal combustion engine EG. The oxygen sensor 25 is attached to an upper portion of the exhaust pipe 23 and projects upward from the exhaust pipe 23. The muffler 24 is connected to a downstream end of the exhaust pipe 23. The muffler 24 reduces the noise of the exhaust flowing therein from the exhaust pipe 23 and discharges the exhaust to the atmosphere. The muffler 24 is located at a right side of the intake box 19.

A downstream end of the CVT intake duct 31 is connected to an inflow port of the CVT case 17. The CVT intake duct 31 includes a duct portion 51 and the stack portion 52. The duct portion 51 is connected to the inflow port of the CVT case 17, and the stack portion 52 is connected to the duct portion 51. A passage of the duct portion 51 communicates with an internal space of the CVT case 17. The duct portion 51 extends upward from the CVT case 17. An upstream end of the duct portion 51 is connected to a downstream end of the stack portion 52.

The stack portion 52 includes the intake port 61a that is an inlet of outside air. The stack portion 52 projects upward from the engine room cover 14 (see FIG. 3). Air flowing from the intake port 61a to the stack portion 52 flows through the duct portion 51 and is supplied to the internal space of the CVT case 17 to cool the continuously variable structure 16.

An upstream end of the CVT exhaust duct 32 is connected to an outflow port of the CVT case 17. The CVT exhaust duct 32 includes a first portion 32a, the second portion 32b, and a third portion 32c. The first portion 32a, the second portion 32b, and the third portion 32c are lined up in this order in a direction from the upstream end of the CVT exhaust duct 32 to the downstream end thereof. The first portion 32a extends from the CVT case 17 to an upper right side. The second portion 32b has an inverted U shape that extends from the first portion 32a and curves downward. To be specific, the second portion 32b has an inverted U shape in which one end thereof is continuous with the first portion 32a, and the other end thereof is continuous with the third portion 32c. The third portion 32c extends downward from the second portion 32b. The first portion 32a and the third portion 32c are adjacent to each other in the left-right direction. To be specific, the first portion 32a and the third portion 32c overlap each other in the left-right direction. The first portion 32a and the third portion 32c are partially coupled to each other by a bridge portion 34.

A lower end portion of the third portion 32c of the CVT exhaust duct 32 has a J shape when viewed from the right side of the vehicle. A downstream end of the third portion 32c includes an exhaust port 33 that is an end opening. The second portion 32b is located higher than the loading space S (see FIG. 4), whereas the first portion 32a and the third portion 32c are located in the engine room ER. Therefore, the exhaust port 33 of the CVT exhaust duct 32 is located in the engine room ER. The exhaust port 33 of the CVT exhaust duct 32 is directed to the EG exhaust assembly 22.

Specifically, the exhaust port 33 is located in front of the downstream end of the exhaust pipe 23 and above the exhaust pipe 23. The exhaust port 33 is directed to a rear lower side such that air discharged from the exhaust port 33 hits the exhaust pipe 23. The exhaust port 33 is located at a front upper side of the oxygen sensor 25. Air discharged from the exhaust port 33 cools the exhaust pipe 23 and the oxygen sensor 25 and then cools the muffler 24.

The stack portion 43 of the EG intake duct 21, the stack portion 52 of the CVT intake duct 31, the second portion 32b of the CVT exhaust duct 32 are lined up in the left-right direction. To be specific, the stack portion 43, the stack portion 52, and the second portion 32b overlap each other when viewed from the left-right direction. In a plan view of the vehicle, the stack portion 43 of the EG intake duct 21 overlaps the air cleaner 18. In the plan view of the vehicle, the stack portion 52 of the CVT intake duct 31 overlaps the CVT case 17. In the plan view of the vehicle, the stack portion 52 of the CVT intake duct 31 also overlaps the air cleaner 18.

In the plan view of the vehicle, the second portion 32b of the CVT exhaust duct 32 is located away from the CVT case 17 and overlaps the exhaust pipe 23. A distance from an upper end of the second portion 32b of the CVT exhaust duct 32 to an upper end of the stack portion 52 of the CVT intake duct 31 is longer than a distance from the upper end of the stack portion 52 of the CVT intake duct 31 to an upper end of the stack portion 43 of the EG intake duct 21.

Figure 9:
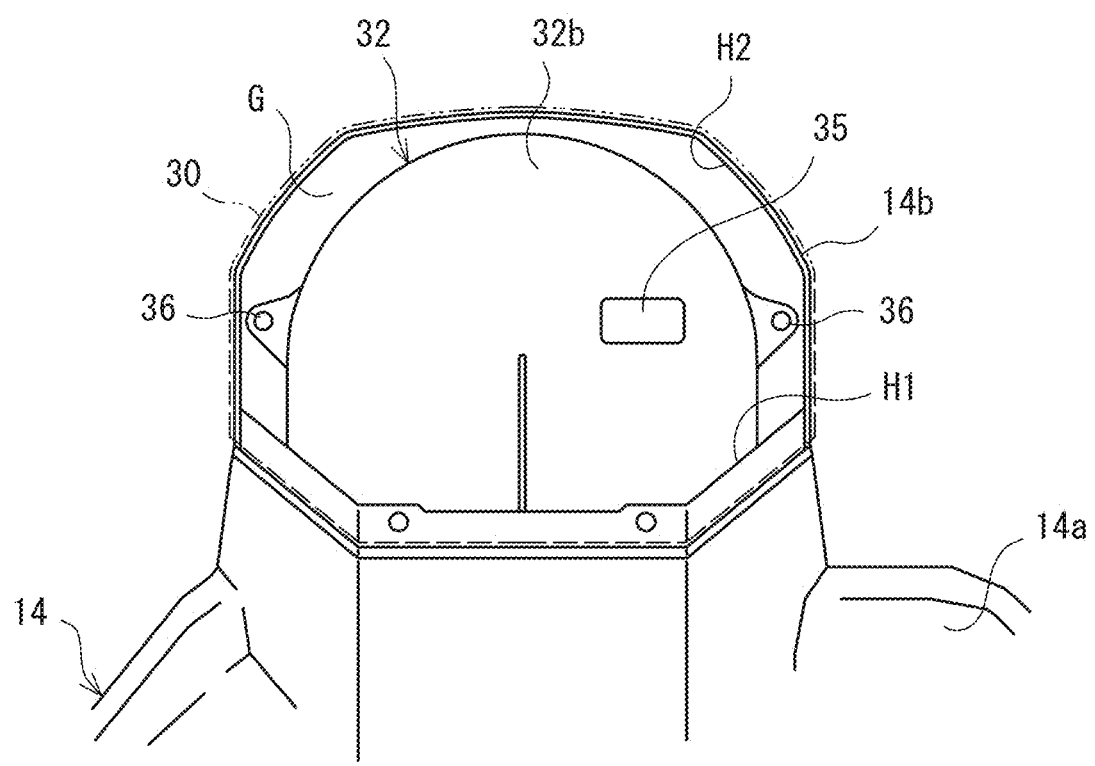
FIG. 9 is an enlarged perspective view showing a duct cover in a region IX of FIG. 4.

FIG. 9 is an enlarged perspective view showing the duct cover 30 in a region IX of FIG. 4. As shown in FIG. 9, the engine room cover 14 includes a peripheral wall portion 14b and the rising wall portion 14b. The peripheral wall portion 14b projects upward from the base portion 14a, and the rising wall portion 14b projects upward from a front portion of the peripheral wall portion 14b. The peripheral wall portion 14b has a tubular shape. The peripheral wall portion 14b includes a duct through hole H1 through which the second portion 32b of the CVT exhaust duct 32 passes upward. The rising wall portion 14b has a recessed shape that is recessed forward. To be specific, the rising wall portion 14b includes a duct exposure hole H2 that is open rearward.

The rising wall portion 14b covers, from the front side, the second portion 32b of the CVT exhaust duct 32 which has passed upward through the duct through hole H1. The duct cover 30 is detachably fixed to the engine room cover 14 so as to close the duct exposure hole H2 and cover the second portion 32b of the CVT exhaust duct 32 together with the rising wall portion 14b. With the duct cover 30 detached from the engine room cover 14, the second portion 32b of the CVT exhaust duct 32 is exposed to the outside of the engine room cover 14 through the duct exposure hole H2.

The second portion 32b of the CVT exhaust duct 32 is supported by the engine room cover 14. Specifically, the second portion 32b of the CVT exhaust duct 32 is fixed to the rising wall portion 14b of the engine room cover 14 by fixtures 36. A gap G that fluidically communicates with the engine room ER is located between the second portion 32b of the CVT exhaust duct 32 and at least one of the duct cover 30 and the rising wall portion 14b.

The exhaust port 33 (see FIG. 6) of the CVT exhaust duct 32 is a main opening of the CVT exhaust duct 32, whereas the second portion 32b of the CVT exhaust duct 32 includes a sub opening 35 through which a passage of the CVT exhaust duct 32 is open to the outside. The sub opening 35 is smaller than the exhaust port 33. The sub opening 35 is open rearward so as to be opposed to the duct cover 30. The sub opening 35 is fluidically connected to the gap G. Even if the exhaust port 33 is closed, the exhaust flowing through the CVT exhaust duct 32 can flow out through the sub opening 35 to the engine room ER.

Figure 10:
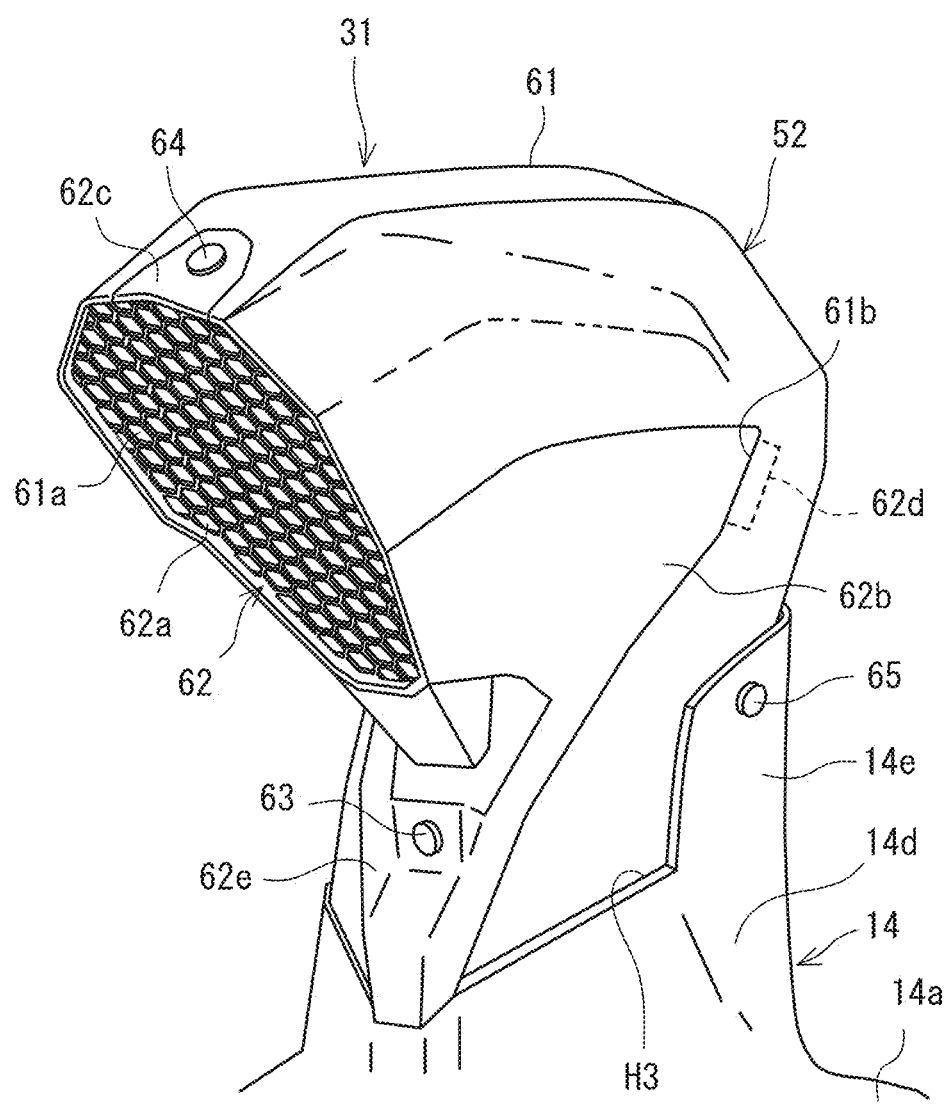
FIG. 10 is an enlarged view of a region X of FIG. 3.

FIG. 10 is an enlarged perspective view of a region X of FIG. 3. Since the stack portion 43 of the EG intake duct 21 and the stack portion 52 of the CVT intake duct 31 are similar in configuration to each other, a detailed explanation of the stack portion 43 of the EG intake duct 21 is omitted, and the stack portion 52 of the CVT intake duct 31 will be mainly described. As shown in FIG. 10, the engine room cover 14 includes a peripheral wall portion 14d and a support wall portion 14e. The peripheral wall portion 14d projects upward from the base portion 14a, and the support wall portion 14e projects upward from a front portion of the peripheral wall portion 14d. The peripheral wall portion 14d has a tubular shape. A tip portion of the peripheral wall portion 14d includes a duct through hole H3 through which the CVT intake duct 31 passes upward.

The stack portion 52 of the CVT intake duct 31 projects upward from the engine room cover 14. The stack portion 52 includes a tubular main body 61 and an attachment 62. The tubular main body 61 includes the intake port 61a, and the attachment 62 is detachably fixed to the tubular main body 61. The intake port 61a is directed to a rear lower side. The tubular main body 61 is made of rubber or elastomer. The attachment 62 is higher in rigidity than the tubular main body 61. For example, the attachment 62 is made by integral molding using synthetic resin. A lower portion of the tubular main body 61 is fitted to the peripheral wall portion 14d of the engine room cover 14 and fixed to the support wall portion 14e by fixtures 65 from a lateral side.

The attachment 62 includes a net portion 62a, an arm portion 62b, and a tab portion 62c. The net portion 62a having a mesh shape covers the intake port 61a of the tubular main body 61. Thus, the net portion 62a allows air to flow into the intake port 61a while preventing foreign matters from getting into the intake port 61a. The arm portion 62b projects from the net portion 62a and partially covers the tubular main body 61. The arm portion 62b is in contact with a side surface and rear surface of the tubular main body 61.

A front end portion of the arm portion 62b includes an inserting portion 62d projecting forward. The tubular main body 61 includes an inserted hole 61b into which the inserting portion 62d of the arm portion 62b is inserted. The inserted hole 61b is located at a front portion of the tubular main body 61. The tab portion 62c projects from an upper end of the net portion 62a and is in contact with an upper surface of the tubular main body 61.

The arm portion 62b of the attachment 62 is fixed to a rear surface of the tubular main body 61 by a fixture 63 at a position under the net portion 62a. The tab portion 62c of the attachment 62 is fixed to the upper surface of the tubular main body 61 by a fixture 64 at a position above the net portion 62a. The inserting portion 62d of the attachment 62 is located between the fixture 63 and the fixture 64 in an upper-lower direction. The fixtures 63 and 64 are located at a rear portion of the attachment 62, and the inserting portion 62d of the attachment 62 is located at a front portion of the stack portion 52.

According to the above-described configuration, the exhaust port 33 of the CVT exhaust duct 32 is located in the engine room ER, and the second portion 32b, having the inverted U shape, of the CVT exhaust duct 32 is located higher than the loading space S of the cargo bed 10. Therefore, water having entered through the exhaust port 33 can be prevented from reaching the inside of the CVT case 17 through the CVT exhaust duct 32.

The second portion 32b of the CVT exhaust duct 32 is exposed to the outside of the engine room cover 14 through the duct exposure hole H2, and the exposed second portion 32b is covered with the duct cover 30. Therefore, even when the second portion 32b of the CVT exhaust duct 32 is located higher than the loading space S of the cargo bed 10, the appearance of the vehicle 1 can be maintained satisfactorily.

The EG intake duct 21, the CVT intake duct 31, and the CVT exhaust duct 32 are supported by the engine room cover 14. Therefore, these ducts 21, 31, and 32 are supported at high positions and can be stabilized even during traveling.

The material of the duct cover 30 is the same as the material of the engine room cover 14. Therefore, the entirety of the engine room cover 14 and the duct cover 30 looks like it has uniform quality, and the appearance of the vehicle 1 can be maintained satisfactorily.

The second portion 32b of the CVT exhaust duct 32 includes the sub opening 35 smaller than the exhaust port 33. The sub opening 35 is fluidically connected to the engine room ER through the gap G. Therefore, even when the off-road vehicle 1 travels in a puddle, and the exhaust port 33 of the CVT exhaust duct 32 is clogged by water, the passage of the CVT exhaust duct 32 can be opened to the outside through the sub opening 35 of the second portion 32b of the CVT exhaust duct 32.

The upper end of the second portion 32b of the CVT exhaust duct 32 is located higher than the upper end of the occupant seat 6. Therefore, water having entered through the exhaust port 33 can be satisfactorily prevented from reaching the inside of the CVT case 17 through the CVT exhaust duct 32.

The exhaust port 33 of the CVT exhaust duct 32 is directed to the EG exhaust assembly 22. Therefore, the EG exhaust assembly 22 located under the cargo bed 10 can be cooled by the air discharged from the exhaust port 33 of the CVT exhaust duct 32. In other words, even though the exhaust port 33 of the CVT exhaust duct 32 is located at a low position to cool the EG exhaust assembly 22, the second portion 32b, having the inverted U shape, of the CVT exhaust duct 32 is located higher than the loading space S of the cargo bed 10. Therefore, the water having entered through the exhaust port 33 can be suitably prevented from reaching the inside of the CVT case 17 through the CVT exhaust duct 32.

In the rear view of the vehicle, the first projection 71 corresponding to the EG intake duct 21 and the second projection 72 corresponding to the CVT intake duct 31 overlap the headrest 6Aa of the driver's seat 6A. In addition, in the rear view of the vehicle, the third projection 73 corresponding to the CVT exhaust duct 32 overlaps the headrest 6Ba of the passenger seat 6B. Therefore, rearward visibility of the driver can be maintained satisfactorily although the ducts 21, 31, and 32 are located at high positions.

In the rear view of the vehicle, the first projection 71 corresponding to the EG intake duct 21 and the second projection 72 corresponding to the CVT intake duct 31 are located at positions that are different from the position of the rearview mirror 13 in the left-right direction. Therefore, the rearward visibility of the driver can be maintained satisfactorily although the ducts 21, 31, and 32 are located at high positions.

The EG intake duct 21 includes the stack portion 43 projecting upward beyond the engine room cover 14, and the CVT intake duct 31 includes the stack portion 52 projecting upward beyond the engine room cover 14. Therefore, clean outside air can be taken in through the intake port 43a of the stack portion 43 and the intake port 61a of the stack portion 52.

The lower portion of the tubular main body 61 of the stack portion 52 is fitted to the peripheral wall portion 14d of the engine room cover 14 and fixed to the peripheral wall portion 14d by the fixtures 65 from a lateral side. Therefore, the tubular main body 61 that is soft can be stably supported.

The stack portion 52 includes: the tubular main body 61 including the intake port 61a and made of rubber or elastomer; and the attachment 62 higher in rigidity than the tubular main body 61. The attachment 62 includes: the net portion 62a covering the intake port 61a; and the arm portion 62b projecting from the net portion 62a and contacting the side surface of the tubular main body 61. Therefore, the attachment 62 higher in rigidity than the tubular main body 61 can have both of the function of a net covering the intake port 61a and the function of giving the rigidity to the tubular main body 61 made of rubber or elastomer.

The arm portion 62b of the attachment 62 includes the inserting portion 62d inserted into the inserted hole 61b of the tubular main body 61. Therefore, the work of attaching the attachment 62 to the tubular main body 61 can be facilitated, and the number of fixtures can be reduced.

The stack portion 43 of the EG intake duct 21 and the air cleaner 18 are located at the same side of a center line in the left-right direction, the center line extending in the front-rear direction of the vehicle 1. In the present embodiment, both of the stack portion 43 of the EG intake duct 21 and the air cleaner 18 are located at a left side of the center line. Moreover, the stack portion 52 of the CVT intake duct 31 and the CVT case 17 are located at the same side of the center line in the left-right direction. In the present embodiment, both of the stack portion 52 of the CVT intake duct 31 and the CVT case 17 are located at the left side of the center line. Therefore, in the plan view of the vehicle, the stack portion 43 and the air cleaner 18 are located close to each other. Moreover, in the plan view of the vehicle, the stack portion 52 and the CVT intake duct 31 are located close to each other. Thus, the routes of the ducts 21 and 31 can be simplified.

In the plan view of the vehicle, the stack portion 43 of the EG intake duct 21 overlaps the air cleaner 18, and the stack portion 52 of the CVT intake duct 31 overlaps the CVT case 17. Therefore, in the plan view of the vehicle, the stack portion 43 and the air cleaner 18 are close to each other as compared to when the stack portion 43 and the air cleaner 18 are located at different positions in the plan view of the vehicle. Moreover, in the plan view of the vehicle, the stack portion 52 and the CVT intake duct 31 are adequately close to each other as compared to when the stack portion 52 and the CVT intake duct 31 are located at different positions in the plan view of the vehicle. Therefore, the routes of the ducts 21 and 31 can be further simplified.

The technology of the present disclosure is not limited to the above embodiment. For example, in the above example, the intake port IP is located at the rear side of the internal combustion engine EG, and the exhaust port EP is located at the front side of the internal combustion engine EG. However, the internal combustion engine EG may be located in a different direction. The continuously variable transmission TM is adjacently located at a left side of the internal combustion engine EG. However, the continuously variable transmission TM may be located adjacent to the internal combustion engine EG in a different direction. The CVT exhaust duct 32 is described as the air duct connected to the drive assembly 12. However, each of the EG intake duct and the CVT intake duct may have a structure similar to the CVT exhaust duct 32.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment or one modified example may be applied to another embodiment or another modified example. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

What is claimed is:
1. An off-road vehicle comprising:
a vehicle body frame;
a cabin including at least one occupant seat supported by the vehicle body frame;
a cargo bed which is supported by the vehicle body frame, is located behind the cabin, and defines a loading space;
an engine room which is located behind the cabin and under and in front of the cargo bed;
a drive assembly located in the engine room and including a prime mover supported by the vehicle body frame and a continuously variable transmission which changes a rotational speed of driving power output from the prime mover; and an air duct which is located in the engine room, is connected to the drive assembly, and includes
a first portion extending upward,
a second portion which extends from the first portion, curves downward in an inverted U shape, and is located higher than the loading space, and
a third portion extending downward from the second portion and including an end opening.

2. The off-road vehicle according to claim 1, further comprising:
an engine room cover which is located between the cabin and the cargo bed in a front-rear direction of the vehicle, defines the engine room from above together with the cargo bed, and includes a duct exposure hole; and
a duct cover which is fixed to the engine room cover so as to cover the duct exposure hole, wherein:
the second portion of the air duct is exposed to an outside of the engine room cover through the duct exposure hole; and
the exposed second portion is covered with the duct cover.

3. The off-road vehicle according to claim 2, wherein the air duct is supported by the engine room cover.

4. The off-road vehicle according to claim 2, wherein a material of the duct cover is the same as a material of the engine room cover.

5. The off-road vehicle according to claim 2, wherein:
the end opening of the air duct is a main opening;
the second portion of the air duct includes a sub opening smaller than the main opening;
a gap which fluidically communicates with the engine room is located between the duct cover and the second portion of the air duct; and
the sub opening is fluidically connected to the gap.

6. The off-road vehicle according to claim 1, wherein an upper end of the second portion of the air duct is located higher than an upper end of the occupant seat.

7. The off-road vehicle according to claim 1, wherein:
the prime mover is an internal combustion engine including an intake port and an exhaust port;
the continuously variable transmission includes a continuously variable structure and a CVT case accommodating the continuously variable structure;
the air duct is a CVT exhaust duct connected to the CVT case; and
the end opening of the air duct is an exhaust port of the CVT exhaust duct,
the vehicle further comprising:
a CVT intake duct connected to the CVT case;
an air cleaner which purifies air to be supplied to the intake port of the internal combustion engine; and
an EG intake duct connected to the air cleaner.

8. The off-road vehicle according to claim 7, further comprising an exhaust assembly located under the cargo bed and including an exhaust pipe connected to the exhaust port of the internal combustion engine, wherein
the exhaust port of the CVT exhaust duct is directed to the exhaust assembly.

9. The off-road vehicle according to claim 7, wherein:
the occupant seat includes a headrest;
the at least one occupant seat comprises a driver's seat and a passenger seat which are lined up in a left-right direction of the vehicle; and
each of projections which partially include the EG intake duct, the CVT intake duct, and the CVT exhaust duct, respectively, are located in front of the cargo bed, and project upward overlaps the headrest of the driver's seat or the headrest of the passenger seat in a rear view of the vehicle.

10. The off-road vehicle according to claim 7, further comprising a rearview mirror located in front of and above the occupant seat, wherein
projections which partially include the EG intake duct, the CVT intake duct, and the CVT exhaust duct, respectively, are located in front of the cargo bed, and project upward are located at positions that are different from a position of the rearview mirror in a left-right direction in a rear view of the vehicle.

11. The off-road vehicle according to claim 7, further comprising an engine room cover which is located between the cabin and the cargo bed in a front-rear direction of the vehicle, defines the engine room from above together with the cargo bed, and includes at least one duct through hole, wherein:
at least one specific intake duct which includes at least one of the EG intake duct and the CVT intake duct passes through the duct through hole of the engine room cover; and
the specific intake duct includes a stack portion projecting upward from the engine room cover and including an intake port.

12. The off-road vehicle according to claim 11, wherein:
the stack portion includes a tubular main body including the intake port;
the engine room cover includes a peripheral wall portion projecting upward and including the duct through hole at a tip thereof; and
a lower portion of the tubular main body is fitted to the peripheral wall portion of the engine room cover and fixed to the engine room cover by a fixture from a lateral side.

13. The off-road vehicle according to claim 11, wherein:
the stack portion includes
a tubular main body including an intake port and
an attachment which is attached to the tubular main body and is higher in rigidity than the tubular main body; and
the attachment includes
a net portion covering the intake port and
an arm portion projecting from the net portion and contacting a side surface of the tubular main body.

14. The off-road vehicle according to claim 13, wherein the attachment is higher in rigidity than the tubular main body.

15. The off-road vehicle according to claim 13, wherein:
the tubular main body includes an inserted hole; and
the arm portion of the attachment includes an inserting portion inserted into the inserted hole.

16. The off-road vehicle according to claim 11, wherein:
the at least one specific intake duct comprises the EG intake duct and the CVT intake duct; and
the stack portion of the EG intake duct overlaps the air cleaner in a plan view of the vehicle.

17. The off-road vehicle according to claim 11, wherein:
the at least one specific intake duct comprises the EG intake duct and the CVT intake duct; and
the stack portion of the CVT intake duct overlaps the CVT case in a plan view of the vehicle.

* * * * *